United States Patent [19]

Olejak

[11] 4,445,255
[45] May 1, 1984

[54] HOSE CLAMP FOR SUPPORTING A VERTICALLY EXTENDING CONTROL LINE

[75] Inventor: Ingo W. V. Olejak, Houston, Tex.

[73] Assignee: Koomey, Inc., Brookshire, Tex.

[21] Appl. No.: 379,606

[22] Filed: May 19, 1982

[51] Int. Cl.³ .......................... F16L 3/08; B65D 63/00
[52] U.S. Cl. ....................................... 24/284; 24/279;
138/106; 138/107; 248/74.1; 425/392
[58] Field of Search ..................... 24/279, 249 R, 284,
24/247, 132 WL, 249 DP; 248/61, 63, 64, 222,
75; 285/259, 419, 245, 253; 138/106, 107, 110,
96 R, 96 T; 425/392; 249/219 R, 79-81

[56] References Cited

U.S. PATENT DOCUMENTS

| | | | |
|---|---|---|---|
| 1,455,330 | 5/1923 | Fordyce | 248/61 |
| 1,725,119 | 8/1929 | Williams | 248/61 |
| 1,726,536 | 9/1929 | Cannon | 248/61 |
| 2,719,025 | 9/1955 | Stone | 24/249 DP |
| 3,083,773 | 4/1963 | Nagel et al. | 24/249 R |
| 3,357,432 | 12/1967 | Sparks | 24/285 |
| 3,672,613 | 7/1972 | Oriani | 24/285 |
| 4,059,872 | 11/1977 | Delesandri | 24/284 |
| 4,139,224 | 2/1979 | Leach | 285/259 |
| 4,155,574 | 5/1979 | Halsey | 285/419 |
| 4,225,103 | 9/1980 | Pate | 138/107 |

*Primary Examiner*—Gene Mancene
*Assistant Examiner*—John Weiss

*Attorney, Agent, or Firm*—Fulbright & Jaworski

[57] ABSTRACT

A hose clamp for supporting a vertically extending control line or hose from a position above water to subsea equipment below the water from a vertically extending vertical support such as a wire cable. The clamp includes a circular body with semi-circular halves pivotally connected at one side and having coacting locking means at their second sides for encircling the control line. The interior of the body includes a plurality of projections, preferably a plurality of vertically spaced circular rows of arcuate projections. The hose includes matching and coacting recesses on the exterior of the hose for mating with the projections on the body when the clamp is locked on the hose. Preferably, the recesses are formed by placing a heated clamp mold around the control line having heated projections similar to the projections on the body which will form the recesses by melting the exterior of the lines. Connecting means for securing the body to the wireline may include three J-shaped hooks which are pivotally connected about the body pivot at one side of the halves. Two of the hooks are connected to one of the halves and face in the same direction. The third hook is connected to the other half and faces the opposite direction of the two hooks and being positioned between the two hooks.

6 Claims, 5 Drawing Figures

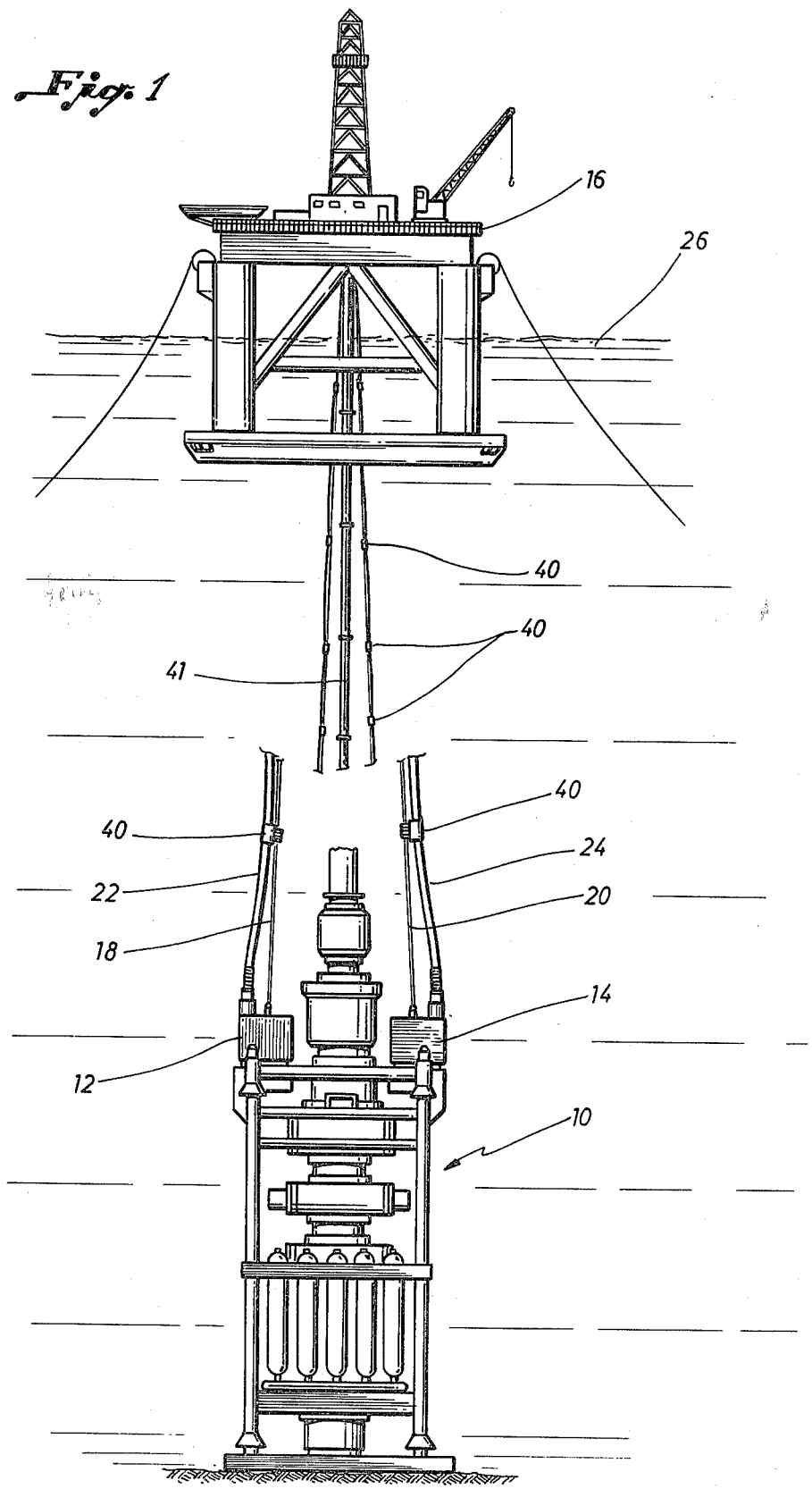

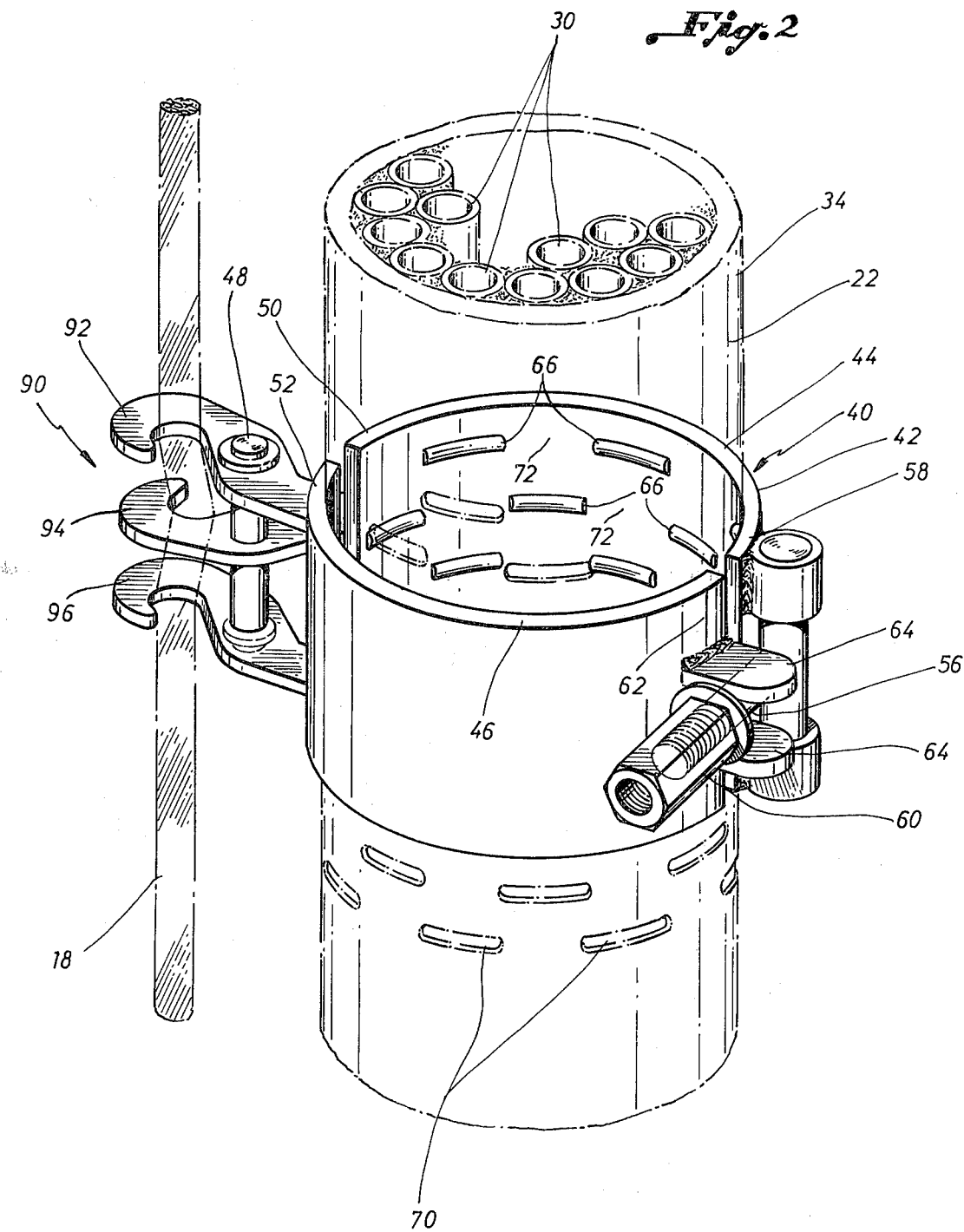

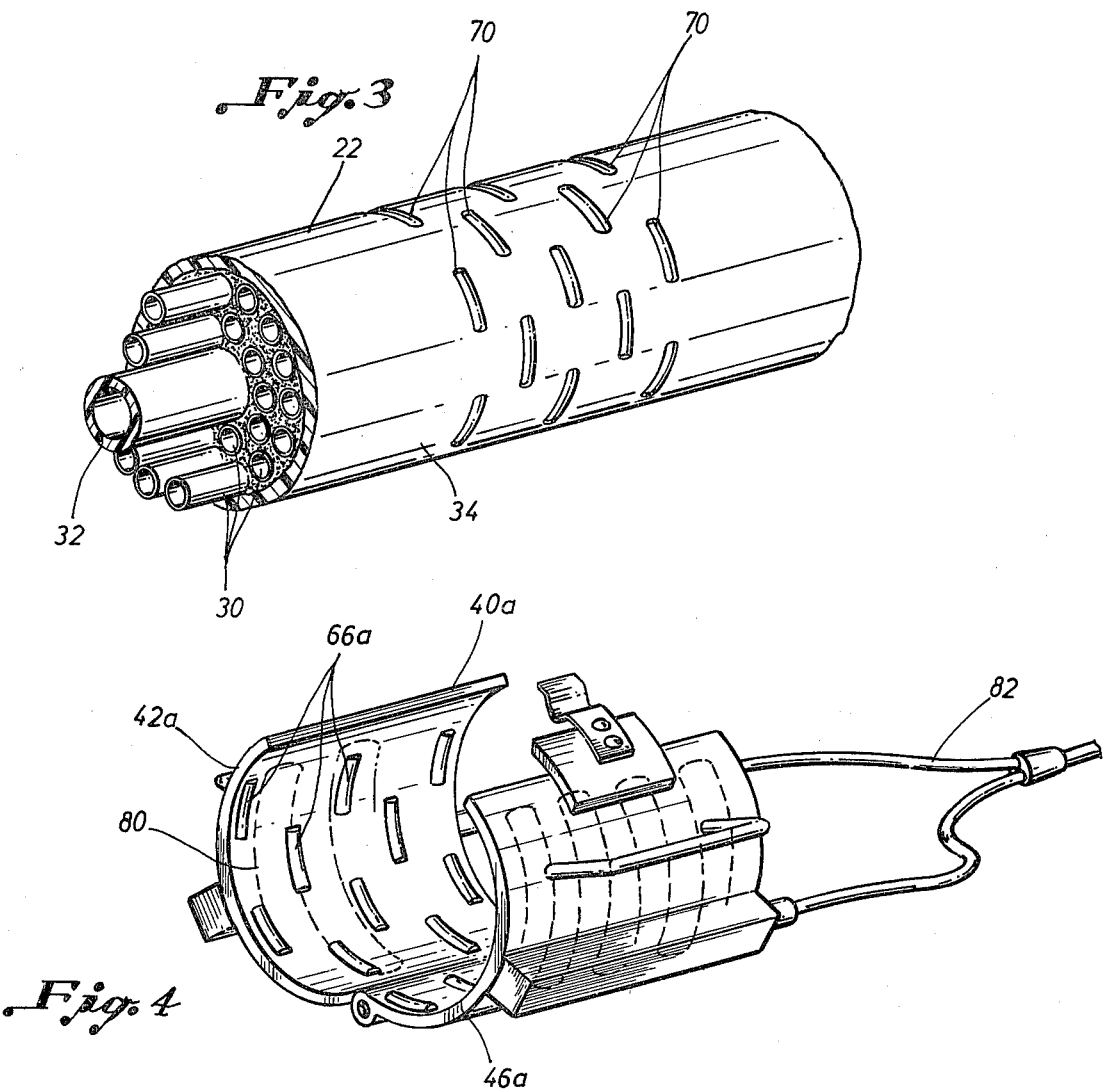
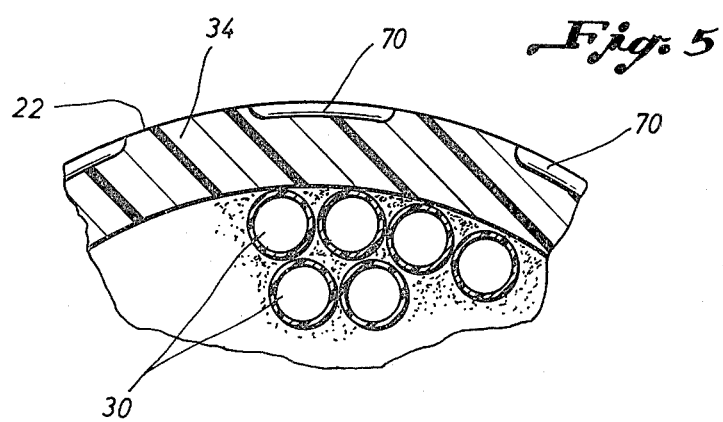

HOSE CLAMP FOR SUPPORTING A VERTICALLY EXTENDING CONTROL LINE

BACKGROUND OF THE INVENTION

In offshore or subsea operations in drilling and controlling subsea well equipment, a control line which may be an electrical control line, but is generally a hydraulic control hose, extends from above the water to the subsea equipment in the water which may be hundreds of feet below the water surface. The vertically extending control line is supported at spaced intervals to a vertically extending support.

However, it has been a problem in the past to securely support the control hose from the vertical support. It is important that any hose clamp securely attached to both the vertical support and the control hose simultaneously. The hose clamp must not slip on either of the two. One additional problem is that the control line, in the case of a hydraulic control hose, is a bundle of hoses containing numerous pilot control lines and a larger power supply hose inside of a plastic sheath or jacket. If the hose clamp grips too tightly on the exterior of the control hose, the clamp may collapse a hose inside of the bundle and prevent its proper operation. On the other hand, if the hose clamp is too loose, the hose will slip and slide inside of the hose clamp and wear away the outer sheath on the bundle. Prior art hose clamps have neglected to consider the fact that the outer jacket of the control line as a source of the problem or the solution. The outer jacket is relatively slick and offers very little frictional resistance to slipping whether it is wet or dry.

The present invention is directed to a hose clamp which is capable of being attached very quickly to the hose and vertical support, will securely grip both the hose and support cable without slipping, but will not jeopardize the integrity of the control line.

SUMMARY

The present invention is directed to providing a hose clamp for supporting a vertically extending control line from a vertically extending support such as a wire cable which includes a circular body having semi-circular halves pivotally connected together at one side and having coacting locking means at their second sides for encircling the control line. The interior of the body includes a plurality of projections extending inwardly and positioned in a plane perpendicular to the longitudinal axis of the body. The control line or hose includes matching and coacting recesses on the exterior of the hose for mating with the projections when the clamp is locked on the hose. Means are connected to the body for securing the body to the vertical support.

A still further object of the present invention is wherein the projections include a plurality of circular rows of arcuate projections vertically spaced. The projections of adjacent rows are rotationally offset relative to each other.

Still a further object of the present invention is wherein the recesses on the exterior of the control line are formed by placing a heated mold clamp, having projections similar in shape to the hose clamp, around the control line wherein the heated projections will form the recesses by melting the exterior of the line.

Still a further object of the present invention is the provision wherein the means connecting the body to the wire cable includes three J-shaped hooks which are pivotally connected about the pivot at the one side of the halves of the body. Two of the hooks are connected to one of the halves and face in the same direction. The third hook is connected to the other half and faces in the opposite direction from the two hooks and is positioned between the two hooks.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is an elevational view of the use of the present invention in a subsea drilling operation having control lines controlling a blowout preventer, FIG. 2 is an enlarged perspective view of a hose clamp supporting a control line from a wire cable, FIG. 3 is a perspective view of a section of the control line showing the preferred positioning of the recesses on the exterior thereof, FIG. 4 is a perspective view of an apparatus for forming the recesses on the exterior of the control line, and, FIG. 5 is an enlarged fragmentary, cross-sectional view of a control hose showing the recesses in the exterior surface.

DESCRIPTION OF THE PREFERRED EMBODIMENT

While the hose clamp of the present invention may be utilized for supporting a vertically extending control line from a vertical support in which the control line may be electrical or hydraulic and may be used to extend from above water to control various types of subsea equipment below the water, the present invention, for purposes of illustration only, will be described in connection with a hydraulic hose bundle for controlling blowout preventers on ocean floors in subsea well drilling operations.

Referring now to FIG. 1, the reference numeral 10 generally indicates a hydraulic subsea blowout preventer having two separate subsea control pods 12 and 14 for controlling the operation of various types of blowout preventers. The pods 12 and 14 are retrievable and are run and retrieved from a suitable drilling platform 16 by wire cables 18 and 20, respectively. A control line or control hose bundle 22 and 24 is connected to the control pods 12 and 14, respectively, for supplying both hydraulic power fluid and hydraulic control fluid to the pods 12 and 14 for actuating the blowout preventer 10. The blowout preventer 10 may be hundreds of feet below the water surface 26. Therefore, it is necessary to support the control hoses 22 and 24 vertically for supporting their weight and horizontally for resisting wave and current action of the water. To do this, the control hose or hoses 22 and 24 are generally connected to the wire cables 18 and 20, respectively, by hose clamps. In some cases the control hose or hoses are connected and supported from the vertically extending riser 41. However, the prior hose clamps were not securely attached to both the wire cables 18 and 20 and the control hoses 22 and 24 and had a tendency to slip on either the cable or the hose. The slipping problem cannot be solved by gripping the control lines 22 and 24 more tightly as the lines 22 and 24 consist of a hose bundle containing numerous pilot control hoses 30 (FIG. 3) and a power supply hose 32 in an outer plastic sheath or jacket 34. If the hose clamp grips too tightly on the hose bundles 22 and 24, it may collapse one of the hoses 30 and 32 on the inside and prevent proper operation of the blowout preventer 10. On the other hand, the plastic sheath 34 is relatively slick when either wet or dry and if the hose clamp is too loosely connected to the lines 22 and 24 the hoses 22 and 24 will slip and slide inside of the hose clamp and wear away the outer plastic sheath 34.

The present invention is directed to providing a hose clamp 40 for connecting to and supporting the hoses 22 and 24 from the wire cables 18 and 20 or the riser 41. Generally, the hose clamps 40 are spaced at suitable intervals, such as 30 feet along the hoses and cables. Referring now to FIG. 2, the hose clamp 40 of the present invention is shown for connecting one of the hydraulic control resilient hose bundles 22 to one of the wire cables 18. The hose clamp 40 consists of a circular body 42 having semi-circular halves 44 and 46 which are pivotally connected around pivot pin 48 by their first sides 50 and 52, respectively. The halves 44 and 46 include coacting locking means such as a threaded pivoting pin 56 connected to the second side 58 of one of the halves, such as 42, and a nut 60 connected to the second side 62 of the other half 46. Threadably securing the nut 60 on the bolt 56 against suitable stops 64 allows the body 42 to encircle the hose bundle 22 and be locked thereon.

The interior of the body 42 is provided with a plurality of projections 66 which extend inwardly. Preferably, the projections are positioned about the interior of the body 42 in circular rows with each circular row positioned in a plane perpendicular to the longitudinal axis of the body 42. Thus, each circle of arcuate projections is also perpendicular to the longitudinal axis of the control hose 22.

The control hose 22 is provided with recesses 70 in its outer sheath or jacket 34 which are positioned in a matching pattern to coact and mate with the projections 66 on the body 42 when the hose clamp 40 is locked on the hose 22. It is noted that each row of projections 66 has a space 72 between adjacent projections 66 so as not to unduly weaken the outer jacket 34 of the control hose 22. It is further noted that adjacent vertical rows of the arcuate projections 66 are rotationally offset relatively to each other. That is, the projections 66 in one row are vertically aligned with the spaces 72 in the adjacent rows of projections 66. Therefore, the pattern of projections 66 will securely support the control hose 22 circumferentially about its exterior, but the recesses 70 are positioned so as not to unduly weaken the strength of the outer jacket 34 of the control hose 22.

Preferably the recesses 70 on the exterior of the control hose 22 are formed by placing a heating hose clamp mold around the hose having heated projections similar to those on the clamp 49 which will form recesses 70 by melting the exterior of the plastic jacket 34 of the the control hose 22. Thus, referring to FIG. 4, a heating type hose clamp mold 40a is shown having projections 66a which are positioned identically in the same pattern to the projections 66 on the hose clamp 40. The clamp 40a includes a heating coil 80 embedded in the semi-circular halves 42a and 46a which is electrically connected to an electrical power source through a cable 82. When the hose clamp mold 40a is positioned about a hose 22 and heated, the projections 66a will form the matching recesses 70 on the exterior of the hose 22. The recesses 70 may be made by the hose manufacturer or in the field by utilizing the portable heated hose clamp mold 40a shown in FIG. 4.

The depth of penetration of the recesses 70, as best seen in FIG. 5, are sufficient to enhance the gripping action on the hose 22 by the projections 66 of the hose clamp 40 but are not deep enough to jeopardize the integrity of the hose 22. For example only, the depth of the recesses 20 may be 0.060 inches. Various other types of patterns of the projections 66 may be utilized to provide the desired gripping and holding action without unduly damaging the strength of the control hose 22.

Referring now to FIG. 2, suitable connecting means generally indicated by the reference numeral 90 is shown for connecting the body 42 to the wire cable 18. The preferred connecting means consists of three J-shaped hooks 92, 94 and 96, which are pivotally connected about the pivot pin 48 to the one sides of the halves 44 and 46. Two of the hooks such as 92 and 96 are connected to the one half 46 and face in the same direction. The third hook 94 is connected to the other half 44 and faces in the opposite direction to the two hooks 92 and 96 and the third hook 94 is positioned between the hooks 92 and 96. Thus, when the halves 44 and 46 are retracted by pivoting around the pivot pin 48, the J hook 94 is retracted away from the hooks 92 and 96. The cable 18 is inserted between the hook 94 and the hooks 92 and 96 as the halves 44 and 46 are positioned about the control hose 22. Closing the halves 44 and 46 and locking them with the nut 60 also encloses the wire cable 18 within the hooks 92, 94 and 96 as the hooks laterally moves a portion of the cable 18 out of axial alignment with the remainder of the cable 18 to securely lock the connecting means 90 to the cable 18. Other suitable connecting means may be provided for connecting the body 42 to the riser 41.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. A hose clamp for supporting a vertically extending flexible control line having a plastic outer jacket containing a plurality of control lines from a vertical support comprising, a circular body having semi-circular halves pivotally connected at one side and having coacting locking means at their second sides for encircling the control hose, the interior of said body including a plurality of projections extending inwardly and positioned in a plan perpendicular to the longitudinal axis of the body, said hose including matching and coacting acting preformed recesses on the exterior of the hose extending into but not through the plastic jacket for mating with the projections when the clamp is locked on the hose for providing vertical support of said hose, means connected to the body for securing the body to the vertical support a plurality of circular rows of arcuate projections vertically spaced with the projections of adjacent rows being rotationally offset relative to each other.

2. The apparatus of claim 1 wherein the recesses on the exterior of the line are formed by placing a heated hose clamp mold around the line having the heated projections which are similar in shape and size to the projections on the body which will form the recesses by melting the exterior of the line.

3. The apparatus of claim 1 wherein the means connecting the body to the vertical support includes,
   three J-shaped hooks which are pivotally connected about the pivot at the one sides of the halves, two of said hooks connected to one of the halves and facing in the same direction, and the third hook being connected to the other half and facing in the opposite direction of the two hooks and being positioned between said two hooks.

4. A hose clamp for supporting a vertically extending hydraulic control resilient hose from a position above water to subsea equipment below water from a vertically extending wire cable comprising,
   a circular body having semi-circular halves pivotally connected at one side and having coacting locking means at their second sides for encircling the control hose,
   the interior of said body including a plurality of vertically spaced circular rows of arcuate projections,
   the exterior of said hose including matching and coating recesses for mating with the projections when the clamp is locked on the hose, said recesses being formed by placing a heated hose clamp around the hose whereby the heated projections will form the recesses by melting the exterior of the hose, and
   means connected to the body for securing the body to the wire cable.

5. The apparatus of claim 4 wherein the vertically spaced rows of arcuate projections are rotationally offset relative to each other.

6. The apparatus of claim 5 wherein the means connecting the body to the wire cable includes,
   three J-shaped hooks which are pivotally connected about the pivot at the sides of the halves, two of said hooks connected to one of the halves and facing in the same direction, and the third hook being connected to the other half and facing in the opposite direction of the two hooks and being positioned between said two hooks.

* * * * *